US010666707B2

(12) United States Patent
Goll

(10) Patent No.: US 10,666,707 B2
(45) Date of Patent: May 26, 2020

(54) NONCONSECUTIVE FILE DOWNLOADING

(71) Applicant: Microsoft Technology Licensing, LLC, Redmond, WA (US)

(72) Inventor: David Alan Goll, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 515 days.

(21) Appl. No.: 15/433,491

(22) Filed: Feb. 15, 2017

(65) Prior Publication Data

US 2018/0198843 A1 Jul. 12, 2018

Related U.S. Application Data

(60) Provisional application No. 62/445,194, filed on Jan. 11, 2017.

(51) Int. Cl.
*H04L 29/08* (2006.01)
*H04L 29/06* (2006.01)
*G06F 16/957* (2019.01)

(52) U.S. Cl.
CPC .......... *H04L 67/06* (2013.01); *G06F 16/9574* (2019.01); *H04L 29/06448* (2013.01);
(Continued)

(58) Field of Classification Search
CPC .................... H04L 67/02; H04L 67/06; H04L 67/102–108; H04L 67/2842;
(Continued)

(56) References Cited

U.S. PATENT DOCUMENTS 8,949,452 B2 2/2015 Harrang et al.
9,229,933 B2 1/2016 Campbell et al.
(Continued)

FOREIGN PATENT DOCUMENTS

WO 2008086307 A2 7/2008
WO 2012094487 A2 7/2012

OTHER PUBLICATIONS

"Bit Torrent Premium", https://freepcgamescracks.wordpress.com/bit-torrent/, Retrieved on: Nov. 3, 2016, 5 pages.
(Continued)

*Primary Examiner* — Brendan Y Higa
(74) *Attorney, Agent, or Firm* — Newport IP, LLC; Benjamin A. Keim

(57) ABSTRACT

A data transfer module on a device receives a request from a program to download a file, and accesses a remote service to begin downloading the file. The data transfer module receives bytes of the file from the service and stores those bytes in a temporary file. The program can also make read requests including an offset into the file. In response to such a request, the data transfer module requests from the service the portion of the file beginning at the specified offset into the file. The data transfer module receives the requested portion of the file from the service and stores those bytes in the temporary file. The program can then read and use the bytes from the file that were downloaded based on the offset prior to the entire desired file being downloaded. Meanwhile, the data transfer module continues downloading the remaining portions of the file.

20 Claims, 5 Drawing Sheets

(52) U.S. Cl.
CPC .... *H04L 29/06462* (2013.01); *H04L 29/0881* (2013.01); *H04L 29/08801* (2013.01); *H04L 65/4069* (2013.01); *H04L 65/4084* (2013.01); *H04L 67/2847* (2013.01); *H04L 67/2842* (2013.01)

(58) Field of Classification Search
CPC ......... H04L 29/06448; H04L 29/06462; H04L 29/08729; H04L 29/08801–0881; H04L 65/4069; H04L 65/4084; H04L 67/06448; H04L 67/2847; H04L 67/32; H04L 47/74–743; G06F 21/10; G06F 8/65; G06F 16/17–172; G06F 16/957–9574; H04N 21/47–47217

See application file for complete search history.

(56) References Cited

U.S. PATENT DOCUMENTS

| | | | |
|---|---|---|---|
| 9,613,042 B1* | 4/2017 | Joseph | G06F 16/16 |
| 2002/0046320 A1* | 4/2002 | Shaath | G06F 3/0607 |
| | | | 711/112 |
| 2006/0031544 A1* | 2/2006 | Dirstine | H04L 67/02 |
| | | | 709/230 |
| 2007/0005220 A1* | 1/2007 | Parikh | G06F 16/957 |
| | | | 701/100 |
| 2008/0014986 A1* | 1/2008 | Yun | G11B 27/031 |
| | | | 455/556.1 |
| 2008/0022012 A1 | 1/2008 | Wang | |
| 2008/0168133 A1* | 7/2008 | Osborne | H04N 5/76 |
| | | | 709/203 |
| 2010/0011060 A1* | 1/2010 | Hilterbrand | G06F 8/65 |
| | | | 709/204 |
| 2010/0257142 A1* | 10/2010 | Murphy | G06F 11/1453 |
| | | | 707/681 |
| 2012/0209946 A1* | 8/2012 | McClure | H04N 21/233 |
| | | | 709/217 |
| 2013/0246643 A1* | 9/2013 | Luby | H04N 21/23439 |
| | | | 709/231 |
| 2014/0344471 A1 | 11/2014 | Valko et al. | |
| 2016/0127440 A1* | 5/2016 | Gordon | H04N 21/23439 |
| | | | 709/219 |
| 2016/0149978 A1* | 5/2016 | Wissingh | H04L 65/4069 |
| | | | 709/231 |
| 2017/0149860 A1* | 5/2017 | Ben Eli | H04L 65/607 |

OTHER PUBLICATIONS

Brinkmann, Martin, "How to import partial torrent downloads into another application", http://www.ghacks.net/2012/11/16/how-to-import-partial-torrent-downloads-into-another-application/, Published on: Dec. 2, 2012, 4 pages.

Narang, Nitin, "What is the difference between Progressive Download, RTMP Streaming and Adaptive Streaming", http://www.mediaentertainmentinfo.com/2015/04/6-concept-series-what-is-the-difference-between-progressive-download-rtmp-streaming-and-adaptive-streaming.html/, Published on: Apr. 22, 2015, 8 pages.

Murai, et al., "Heterogeneous download times in a homogeneous BitTorrent swarm", In Journal of Computer Networks, vol. 56, Issue 7, May 2012, 2 pages.

Hiraoka, et al., "A Progressive Download Method Using Multiple TCP Flows on Multiple Paths", In Proceedings of 10th International Conference on Broadband and Wireless Computing, Communication and Applications, Nov. 4, 2015, 1 pages.

Nikolaus, et al., "Adaptive progressive download based on the MPEG-4 file format", In Journal of Zhejiang University-Science A, vol. 7, Supplement 1, Jan. 2006, 1 pages.

Yamamoto, et al., "Performance evaluation of peer-to-peer progressive download in broadband access networks", In IEICE Transactions on Communications, vol. E93-B, Issue 3, 2010, 1 pages.

\* cited by examiner

NONCONSECUTIVE FILE DOWNLOADING

RELATED APPLICATIONS

This application claims priority to U.S. Provisional Application No. 62/445,194, filed Jan. 11, 2017, entitled "Nonconsecutive File Downloading", the disclosure of which is hereby incorporated by reference herein in its entirety.

BACKGROUND

Computing devices have become increasingly interconnected, being able to access large amounts of data via networks such as the Internet. This has allowed for various content distribution models in which data can be downloaded to a computing device via a network rather than copied via a disc. Although these distribution models involving network downloads are beneficial, they are not without their problems. One such problem is that given the size of content files that can be downloaded, it can be time-consuming to download large content files, particularly over slow networks. This time-consuming download can be frustrating for users, leading to user dissatisfaction with their computing devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a service is communicated with to retrieve a file from the service via a network. A request for a particular portion of the file in nonconsecutive order is received from a program, and the requested particular portion of the file is retrieved from the service. The retrieved particular portion of the file is stored and made available to the program prior to the entirety of the file being retrieved from the service.

In accordance with one or more aspects, a program communicates, to a nonconsecutive data transfer module in a computing device, a request for a file to be retrieved from a service, and an indication of a temporary file that includes at least some of the data for the file is received from the nonconsecutive data transfer module. A request for a particular portion of the file in nonconsecutive order is communicated to the nonconsecutive data transfer module. Data stored in the particular portion of the temporary file is read from the temporary file, and used by the program prior to the downloading of the file being completed.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
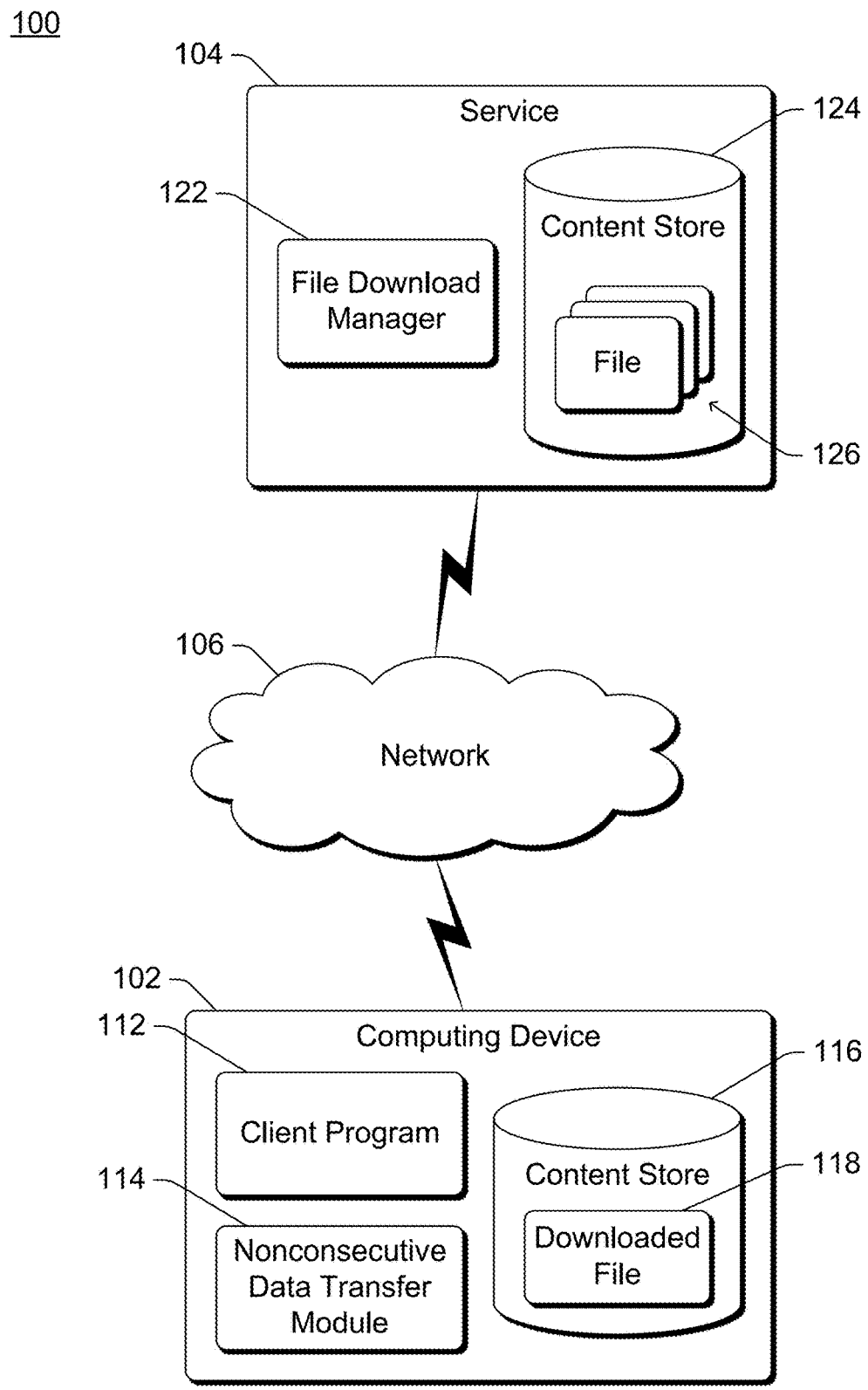
FIG. 1 illustrates an example system implementing the nonconsecutive file downloading in accordance with one or more embodiments.

Nonconsecutive file downloading is discussed herein. A client program running on a computing device can request downloading of a desired file. A data transfer module on the computing device receives the request and accesses a remote service to begin downloading the file. The data transfer module receives bytes of the file from the remote service and stores those bytes in a temporary file. Once all the bytes of the file have been received, the temporary file is completed and converted to a permanent file that can be accessible to various different programs running on the computing device.

The client program that requested downloading of the desired file can also access the bytes of the temporary file as the file is being downloaded. Thus, the client program can read and use bytes of the temporary file prior to the file being fully downloaded. The client program can also make read requests for the file to the data transfer module, the read requests including an offset into the desired file. In response to a read request with an offset, the data transfer module requests from the remote service the portion of the desired file based on (e.g., beginning at) the offset into the desired file. The data transfer module receives bytes of the file from the remote service based on (e.g., beginning at) the offset into the desired file, and stores those bytes in the temporary file. The client program can then read and use the bytes from the temporary file that were downloaded based on the offset prior to the entire desired file being downloaded. The data transfer module thus supports downloading bytes of a file from the remote service nonconsecutively (e.g., not in the consecutive order in which the bytes are stored in the file) and thus is also referred to as a nonconsecutive data transfer module. The order in which the bytes of the file are downloaded from the remote service depends at least in part on the offsets included in the read requests from the client program.

By way of example, a data file at the remote service may include hundreds of font definitions that are used by a word processing program to display characters in various different fonts. The word processing program requests download of the data file, and the data transfer module begins downloading the data file from the remote service starting at the beginning of the data file. The data file may be very large (e.g., tens or hundreds of megabytes), and the word processing program may know that the font it currently desires to display is stored beginning at byte number 2,000,001 in the data file. The word processing program issues a read request to the data transfer module, requesting downloading of the data beginning at byte number 2,000,001 in the data file. The remote service sends the data beginning at byte number 2,000,001 to the data transfer module, which receives and stores the data in the temporary file. Once all of the data for that font definition has been downloaded, the word processing program can begin displaying characters using that font definition without having had to wait for all font definitions stored earlier in the file (e.g., between byte number 1 and byte number 2,000,000) to have been downloaded. This increases the speed with which the program can obtain the particular data within a file that the program desires, thereby improving the performance and usability of the program as well as the computing device.

FIG. 1 illustrates an example system 100 implementing the nonconsecutive file downloading in accordance with one or more embodiments. System 100 includes a computing device 102 that can communicate with a service 104 via a network 106. Network 106 can be a variety of different networks, including the Internet, a local area network (LAN), a public telephone network, an intranet, other public and/or proprietary networks, combinations thereof, and so forth. As the service 104 is accessed via the network 106, the service 104 is also referred to as a remote service.

Computing device 102 can be a variety of different types of devices, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, augmented reality (AR) device, virtual reality (VR) device, watch, bracelet), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. Thus, computing device 102 may range from a full-resource device with substantial memory and processor resources (e.g., personal computers, game consoles) to a low-resource device with limited memory and/or processing resources (e.g., traditional set-top boxes, hand-held game consoles).

The service 104 can be implemented using one or more computing devices. Similar to the discussion of computing device 102, the service 104 can be implemented using a variety of different devices, ranging from full-resource devices with substantial memory and processor resources to low-resource devices with limited memory and/or processing resources. The service 104 can be implemented using multiple computing devices of the same or different types.

The computing device 102 includes a client program 112, a nonconsecutive data transfer module 114, and a content store 116. The client program 112 can be any of a variety of different programs that can be run on the computing device 102, such as application programs, operating system programs, and so forth. By way of example, the client program 112 can be a word processing program, a video playback program, and so forth.

The nonconsecutive data transfer module 114 manages downloading of files requested by the client program 112 from the service 104. This downloading of the content of a file can be done in a nonconsecutive manner as discussed in more detail below. The nonconsecutive data transfer module 114 can manage multiple active downloads concurrently on behalf of one or more client programs 112.

The content store 116 is a storage device that stores a downloaded file 118. Although a single downloaded file 118 is illustrated in FIG. 1, it should be noted that the content store 116 can store any number of downloaded files. The content store 116 can be implemented as any of a variety of different types of storage devices, such as a magnetic disk, an optical disc, solid state (e.g., Flash) memory, and so forth. Although illustrated as being part of the computing device 102, it should be noted that the content store 116 can alternatively be external to and communicatively coupled to the computing device 102, such as via a Universal Serial Bus (USB), Thunderbolt, or other wired connection, or via a Wireless USB, infrared, or other wireless connection.

The service 104 includes a file download manager 122 and a content store 124. The file download manager 122 communicates with the computing device 102 to download one or more files 126 from the content store 124 to the computing device 102. Although a single computing device 102 is illustrated in FIG. 1, the service 104 can communicate with any number of computing devices to download files 126 to the computing devices. The content store 124 can be implemented as any of a variety of different types of storage devices, such as a magnetic disk, an optical disc, solid state (e.g., Flash) memory, and so forth.

During operation, the client program 112 can desire to download a file. This file can include various different content, such as data and/or instructions that the client program 112 desires to use. For example, the client program 112 can desire to download a file that includes multiple font definitions that the client program 112 desires to use to display particular letters, numbers, symbols, and so forth. By way of another example, the client program 112 can desire to download a file that includes a movie or other video program that the client program 112 desires to playback at the computing device 102.

The client program 112 communicates a request to the nonconsecutive data transfer module 114 for the desired file. In one or more embodiments, the request includes an identifier of the file (e.g., a file name) and an identifier of the location of the file (e.g., a particular service, a particular folder or path name (e.g., a uniform resource locator (URL)). Alternatively, the client program 112 need not include both the identifier of the file and the identifier of the location of the file. For example, the location of the file can be inherent in the identifier of the file (e.g., the file name). By way of another example, nonconsecutive data transfer module 114 can be pre-programmed or otherwise configured with a default location, and the default location is used by all requests from the client program 112 (although can optionally be overridden by the client program 112 providing a location of the file).

The nonconsecutive data transfer module 114 communicates with the service 104 to obtain the requested file. The nonconsecutive data transfer module 114 sends a request via the network 106 to the file download manager 122 for the file identified by the client program 112, which is one of the files 126. The nonconsecutive data transfer module 114 can communicate with the file download manager 122 using various different protocols, such as the Hypertext Transport Protocol (HTTP). Any of various different versions of HTTP can be used, such as HTTP/1.1 (January 1997) or HTTP/2 (May 2015).

In one or more embodiments, the nonconsecutive data transfer module 114 makes a set of file range requests (e.g., HTTP range requests) to retrieve ranges of bytes from the requested file. The file download manager 122 receives each file range request, retrieves the requested range of bytes from the requested file, and returns the retrieved bytes to the nonconsecutive data transfer module 114. The nonconsecutive data transfer module 114 receives these bytes from the file download manager 122 and stores them in a temporary file, shown as downloaded file 118 in FIG. 1. In one or more embodiments, the file download manager 122 begins with an offset of zero (which refers to the beginning of the file), requests a certain number of bytes, and then makes successive range requests for consecutive sets of bytes in the file. The size of the ranges requested can vary based on various different criteria, such as the network connection quality, the resources of the computing device 102 (e.g., data buffer sizes), and so forth. For example, the size of the ranges can be 64 kilobytes, 3 megabytes, and so forth.

The client program 112 can read the contents of the downloaded file 118 as the file is being downloaded. In one or more embodiments, the nonconsecutive data transfer module 114 maintains a record of the portions (e.g., byte ranges) of the file that have been downloaded, and the client program 112 can obtain from the nonconsecutive data transfer module 114 an indication of which portion(s) of the file (e.g., a list of byte ranges for the file) have been downloaded and are available in the downloaded file 118. The client program 112 can obtain the indication of which portion(s) of the file have been downloaded and are available in the downloaded file 118 in various manners, such as sending a request to the nonconsecutive data transfer module 114, registering a callback that the nonconsecutive data transfer module 114 uses to notify the client program 112 each time there is a change in the portion(s) of the file that have been downloaded and are available in the downloaded file 118, and so forth.

The client program 112 oftentimes desires to have the bytes at a particular byte range in the file. For example, the file requested by client program 112 may include definitions for hundreds of different fonts that are usable by the client program 112 to display letters, numbers, or other characters. The client program 112 may, at the time the file is requested, desire to display characters using a particular font that is the $85^{th}$ out of 237 different font definitions in the file. The client program 112 is aware of the offset (and optionally the byte range—how many bytes beginning at that offset) that the desired font is at, and sends a request to the nonconsecutive data transfer module 114 for that offset.

In one or more embodiments, the client program 112 can request multiple offsets for a file concurrently. For example, the file requested by client program 112 may include definitions for hundreds of different fonts that are usable by the client program 112 to display letters, numbers, or other characters. The client program 112 may, at the time the file is requested, desire to display characters using one font that is the $85^{th}$ out of 237 different font definitions in the file and another font that is the $123^{rd}$ out of the 237 different font definitions in the file. The client program 112 is aware of the offsets (and optionally the byte ranges) that the desired fonts are at, and sends a request to the nonconsecutive data transfer module 114 for both offsets. The nonconsecutive data transfer module 114 then downloads the byte ranges that includes the definitions for those two requested fonts.

The nonconsecutive data transfer module 114 receives the request from the client program 112, and sends one or more file range requests (e.g., HTTP range requests) to retrieve ranges of bytes from the requested file beginning at the specified offset. The file download manager 122 receives each file range request, retrieves the requested range of bytes from the requested file, and returns the retrieved bytes to the nonconsecutive data transfer module 114. The nonconsecutive data transfer module 114 receives these bytes from the file download manager 122 and stores them in downloaded file 118. The client program 112 can read the contents of the downloaded file 118 as the file is being downloaded, so as soon as the byte range that includes the definition for the desired font is stored in the downloaded file 118, the client program can read the desired font and use that font as desired (e.g., to display various characters using that font).

The client program 112 can determine the offset into the requested file where the desired data resides in a variety of different manners. In one or more embodiments, the client program 112 obtains information describing the offsets into the file from the service 104. This information can be included, for example, as a table of contents in the beginning of the requested file (e.g., a table of contents listing identifiers of fonts and offsets to their locations in the requested file), as metadata associated with the requested file, and so forth. Additionally or alternatively, this information describing the offsets into the file can be obtained by the client program 112 from other services or devices (e.g., via the network 106). Additionally or alternatively, this information describing the offsets into the file can be inherent in a request (e.g., a user request) received by the client program 112. For example, if the user request is to jump forward in a movie to a location 43 minutes, 54 seconds into the movie, the offset into the file is the byte offset into the file that corresponds to a playback time of 43 minutes, 54 seconds into the movie.

In one or more embodiments, the client program 112 also determines the byte range for particular data within the file. This byte range is, for example, the offset plus some number of bytes where particular data (e.g., a particular font definition) is stored in the file. The client program 112 can obtain the byte range for particular data within the file from various sources, such as any of the sources discussed above from which the offset can be obtained. Additionally or alternatively, the client program 112 can determine the byte range for particular data within the file based on the offsets. For example, if the offset information obtained by the client program 112 indicates that one part of the downloaded file (e.g., one font definition) begins at byte x in the file and the next part of the downloaded file (e.g., the next font definition) begins at byte y in the file, then the client program can readily determine that the byte range for the one part of the downloaded file is from byte x to byte (y−1).

It should be noted that this byte range where particular data (e.g., a particular font definition) is stored is different than the file range requests discussed above. The byte range where particular data is stored refers to a byte range for a particular portion of the file (e.g., the byte range that includes a particular font definition), whereas the file range request refers to how many bytes are retrieved from the service 104 per file range request. The byte range of a file range request can be (and oftentimes is) a different byte range than the byte range where particular data is stored. For example, the byte range where particular data is stored in the file may be a 4 megabyte range, and the nonconsecutive data transfer module 114 can send multiple file range requests for 64 kilobytes each to retrieve the full 4 megabyte portion of the file from the service 104.

The techniques discussed herein allow a file to be downloaded in a nonconsecutive manner, rather than requiring the bytes of the file to be downloaded consecutively. This allows a client program to access the parts of the file that it desires without waiting for the entire file to be downloaded, or waiting for the consecutive downloading of the file to download the desired part of the file. The client program can seek or jump to any location in the file and have the bytes at that location without having to wait for those bytes to have arrived consecutively from the beginning of the file. This allows the client program to get access to and use the parts of the file that it desires, improving performance of, and usability of, the client program 112 and the computing device 102.

The techniques discussed herein differ from data streaming in various different manners. In data streaming, data from a file is received at the computing device 102, buffered temporarily, and then displayed or played back by the client program 112. In contrast, the techniques discussed herein store the file on the computing device 102. If the user requests jumping to a particular location in the file (e.g., for playback of audio/video content at that particular location), the previously downloaded data as well as the data downloaded after jumping to the particular location is saved on the computing device 102. This avoids, for example, the need to download the same data multiple times.

Figure 2:
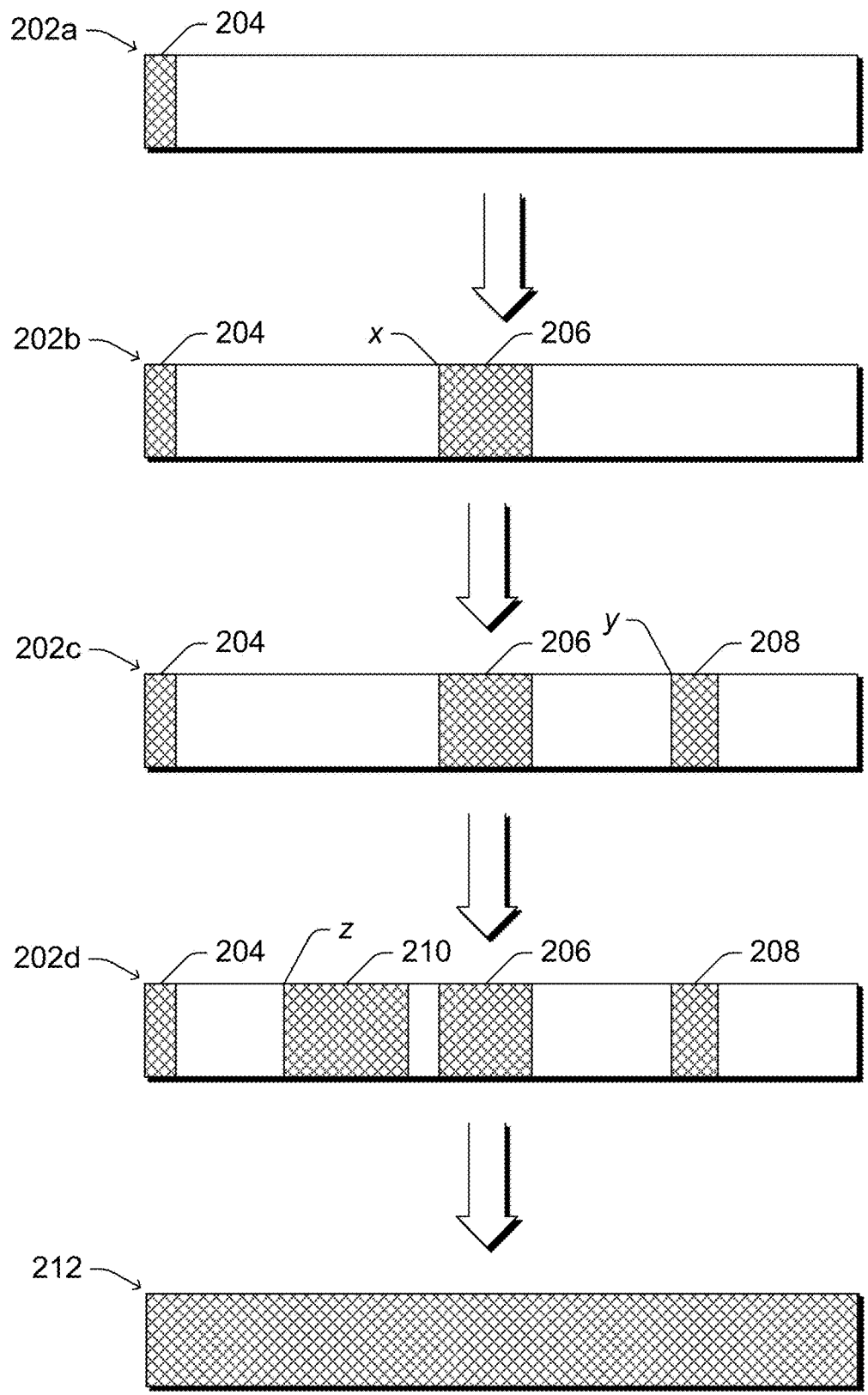
FIG. 2 illustrates the nonconsecutive downloading of a file in accordance with one or more embodiments.

FIG. 2 illustrates the nonconsecutive downloading of a file in accordance with one or more embodiments. FIG. 2 illustrates an example temporary file 202 that is the result of a request to download a file from a service. FIG. 2 illustrates the temporary file 202 over time as the data for the temporary file 202 is downloaded. The nonconsecutive data transfer module 114 begins downloading the requested file from the service 104 as discussed above. The downloading begins at the start or initial bytes of the file (e.g., offset of zero into the file), and initially the beginning bytes 204 are downloaded into the temporary file, shown as temporary file 202a.

After some time has elapsed, the client program 112 requests that reading of the file begin at a particular offset x into the file. In response the nonconsecutive data transfer module 114 continues downloading the file beginning at offset x, effectively jumping to location x in the file. The nonconsecutive data transfer module 114 downloads the bytes 206 of the file beginning at offset x into the temporary file, shown as temporary file 202b. The bytes in the file being downloaded between bytes 204 and bytes 206 (shown as the non-crosshatched area between bytes 204 and 206) have not yet been downloaded to the temporary file 202b.

After some additional time has elapsed, the client program 112 requests that reading of the file begin at a particular offset y into the file. In response the nonconsecutive data transfer module 114 continues downloading the file beginning at offset y, effectively jumping to location y in the file. The nonconsecutive data transfer module 114 downloads the bytes 208 of the file beginning at offset y into the temporary file, shown as temporary file 202c. The bytes in the file being downloaded between bytes 204 and bytes 206 (shown as the non-crosshatched area between bytes 204 and 206) as well as the bytes in the file being downloaded between bytes 206 and bytes 208 (shown as the non-crosshatched area between bytes 206 and 208) have not yet been downloaded to the temporary file 202c.

After some additional time has elapsed, the client program 112 requests that reading of the file begin at a particular offset z into the file. In response the nonconsecutive data transfer module 114 continues downloading the file beginning at offset z, effectively jumping to location z in the file. The nonconsecutive data transfer module 114 downloads the bytes 210 of the file beginning at offset z into the temporary file, shown as temporary file 202d. The bytes in the file being downloaded corresponding to the non-crosshatched areas in the temporary file 202d (e.g., between bytes 204 and 210, between bytes 210 and 206, between bytes 206 and 208, and from bytes 208 to the end of the file) have not yet been downloaded to the temporary file 202c.

Assuming the client program 112 issues no more additional requests to read the file from particular offsets, the nonconsecutive data transfer module 114 continues downloading the portions of the file that have not yet been downloaded (e.g., the portions shown without cross-hatching in temporary file 202d). These portions can be downloaded in any order as desired by the nonconsecutive data transfer module 114. Once all the portions are downloaded, the temporary file is converted to a permanent file 212. The converting of the file from temporary to permanent can include changing the name of the file, changing the location (e.g., folder) where the file is stored in the content store 116, changing access controls on the file, and so forth. A permanent file is treated as any other file on the computing device 102, and can be accessed and/or modified in accordance with access controls on the file.

By storing the bytes of the file in a temporary file until all the bytes of the file are downloaded, the computing device avoids the situation where another program on the computing device 102 attempts to read the file believing that the file is complete. However, in alternate embodiments the file need not be downloaded into a temporary file, and other mechanisms (e.g., access control restrictions) can be implemented to avoid other programs from accessing the file before its download is complete.

Figure 3A:
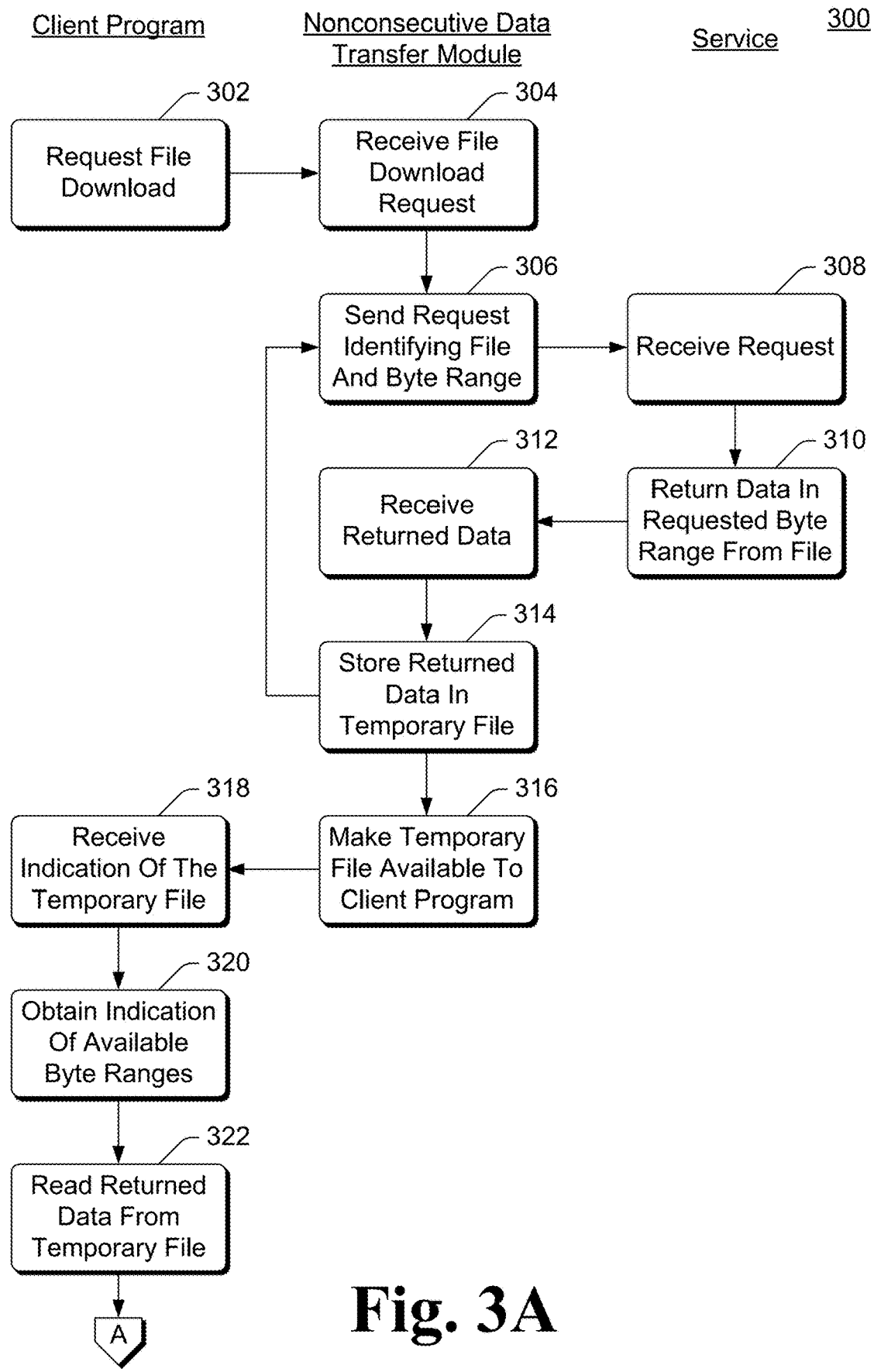
FIGS. 3A and 3B are a flowchart illustrating an example process for implementing nonconsecutive file downloading in accordance with one or more embodiments.
Figure 3B:
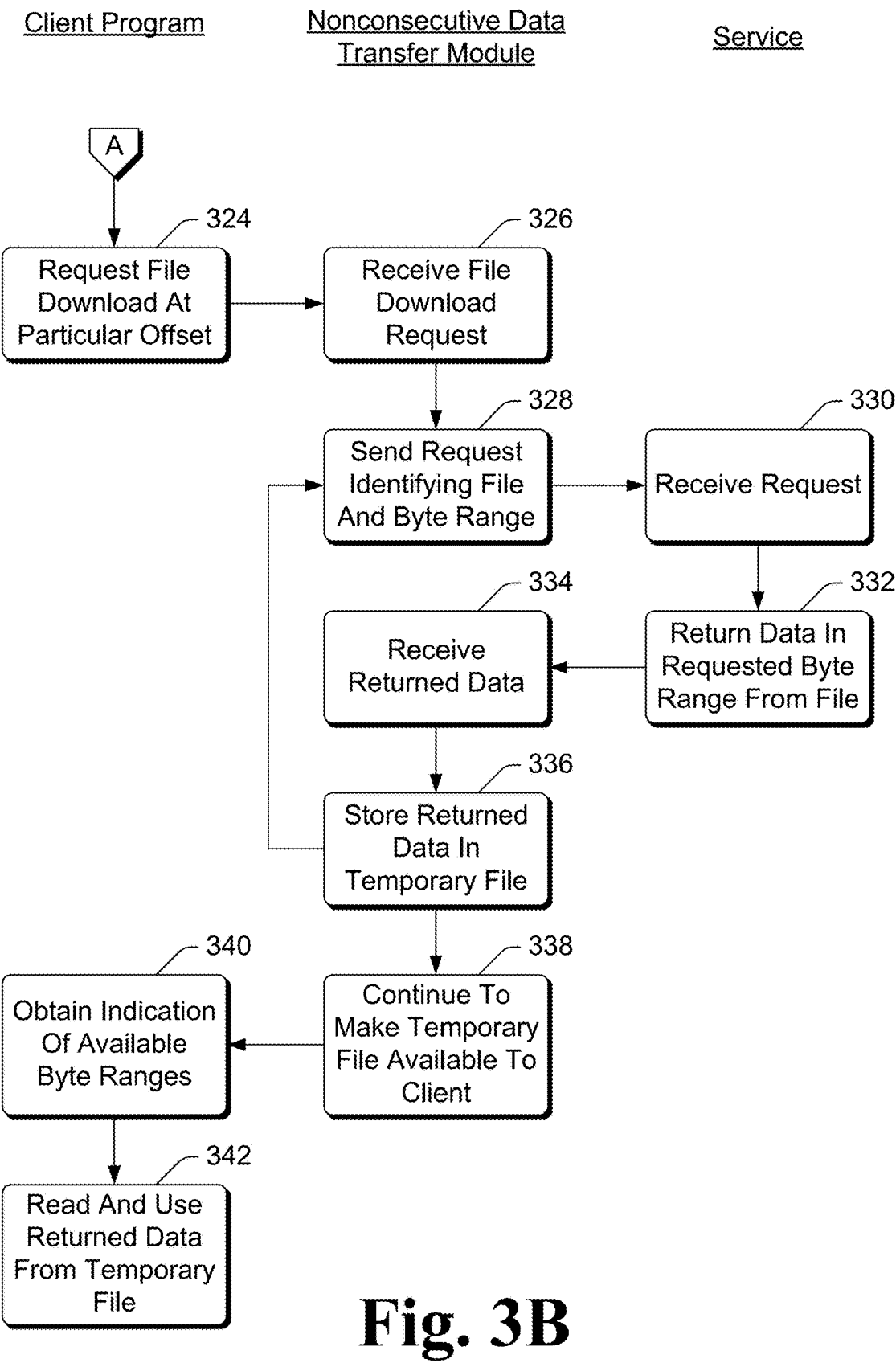

FIGS. 3A and 3B are a flowchart illustrating an example process 300 for implementing nonconsecutive file downloading in accordance with one or more embodiments. Process 300 can be implemented in software, firmware, hardware, or combinations thereof. Acts of process 300 illustrated on the left-hand side of FIGS. 3A and 3B are carried out by a client program, such as client program 112 of FIG. 1. Acts of process 300 illustrated in the middle of FIGS. 3A and 3B are carried out by a nonconsecutive data transfer module, such as nonconsecutive data transfer module 114 of FIG. 1. Acts of process 300 illustrated on the right-hand side of FIGS. 3A and 3B are carried out by a service, such as service 104 of FIG. 1. Process 300 is shown as a set of acts and is not limited to the order shown for performing the operations of the various acts. Process 300 is an example process for implementing nonconsecutive file downloading; additional discussions of implementing nonconsecutive file downloading are included herein with reference to different figures.

In process 300, the client program requests downloading of a file (act 302). The file can be specified in various manners, such as by name and location. Various additional information can optionally be provided as part of the request, such as the length of the file. Alternatively, the length of the file can be obtained in other manners, such as from the service in response to a query by the data transfer module for information regarding the file. The request is received by the data transfer module (act 304), which sends a request identifying the file and a byte range to the service (act 306). In one or more embodiments, the byte range for the initial request sent in act 302 for the file is at an offset of zero bytes (the beginning of the file), although other offsets can alternatively be used as a default by the data transfer module. The byte range requested in act 306 is a file range request, the size of which can vary based on various different criteria as discussed above.

The service receives the request (act 308) and returns the data in the requested byte range to the nonconsecutive data transfer module (act 310). The nonconsecutive data transfer module receives the data from the service (act 312), stores the data in a temporary file (act 314), and makes the temporary file available to the client program (act 316). Making the temporary file available to the client program includes, for example, providing an indication of the name and/or location of the temporary file in the content store 116 of the computing device. The nonconsecutive data transfer module also repeats act 306, 312, and 314 repeatedly sending requests for byte ranges for the file, receiving the requested byte ranges and storing those byte ranges in the temporary file. These byte ranges are consecutive byte ranges, with the byte range in one request beginning at the ending of the byte range of the previous request (or the byte range previously received from the service).

The client program receives the indication of the temporary file (318) and also obtains an indication of available byte ranges in the file (act 320). The available byte ranges of the file refer to byte ranges of the file that have been downloaded by the nonconsecutive data transfer module and are stored in the temporary file. The client program can obtain the indication of available byte ranges in one or more of various manners, such as querying the nonconsecutive data transfer module for the available byte ranges and/or registering for (and receiving) byte range notifications form the nonconsecutive data transfer module. The client program reads the returned data from the available byte ranges of the temporary file as desired (act 322). The client program can use the read data in any manner desired, such as displaying the data, using the data to determine how to display content, and so forth.

Subsequent to the request in act 302, the client program requests downloading of the file at a particular offset (act 324). The particular offset is the offset into the file where the data desired by the client program resides. The request in act 324 optionally also includes a byte range that is desired by the client program. The particular offset, optionally with the desired byte range, specifies a portion of the file that is desired by the client program. The request is received by the data transfer module (act 326), which sends a request identifying the file and a byte range to the service (act 328). This byte range can be the byte range requested by the client program, or a default byte range used by the nonconsecutive data transfer module (e.g., based on network traffic, buffer size, and so forth).

The service receives the request (act 330) and returns the data in the requested byte range to the nonconsecutive data transfer module (act 332). The nonconsecutive data transfer module receives the data from the service (act 334), and stores the data in the temporary file (act 336). The nonconsecutive data transfer module also repeats act 328, 334, and 336 repeatedly sending requests for byte ranges for the file, receiving the requested byte ranges and storing those byte ranges in the temporary file. These byte ranges in acts 328, 334, and 336 are consecutive byte ranges after the first byte range requested in response to the request received in act 324, with the byte range in one request beginning at the ending of the byte range of the previous request (and skipping over any byte ranges previously received from the service).

The nonconsecutive data transfer module continues to make the temporary file available to the client program (act 338) and the client program obtains an indication of available byte ranges in the file (act 340). The client program can obtain the indication of available byte ranges in one or more of various manners, such as querying the nonconsecutive data transfer module for the available byte ranges and/or registering for (and receiving) byte range notifications form the nonconsecutive data transfer module. The client program reads the returned data from the available byte ranges of the temporary file as desired (act 342). The client program can use the read data in any manner desired, such as displaying the data, using the data to determine how to display content, and so forth.

After the portion of the file at the specified offset has completed, the nonconsecutive data transfer module automatically continues retrieving additional portions of the file that have not yet been retrieved from the service. This retrieval of additional portions can automatically continue from different offsets into the file, such as at the end of the byte range(s) retrieved in response to the request for the portion of the file at the specified offset, at an offset into the file that is after the last byte range received in act 312, and so forth.

It should be noted that process 300 can optionally return to act 324 at any time if the client program desires to read bytes of the file beginning at a different offset. It should also be noted that, absent any request for downloading of the file at a particular offset in act 324, the nonconsecutive data transfer module continues to retrieve the content of the file consecutively from the service in acts 328, 334, and 336.

Returning to FIG. 1, the nonconsecutive data transfer module 114 is illustrated as being separate from the client program 112. The nonconsecutive data transfer module 114 can operate as a shared service that can have multiple active downloads on behalf of one or more client programs 112 at any time, or as service that can have one or more active downloads on behalf of a single client program 112 at any time. By way of example, a client program 112 that is a video playback application may access a nonconsecutive data transfer module 114 (e.g., that is a service provided as part of an operating system running on the computing device 102) to nonconsecutively download one or more files. Additionally or alternatively, the nonconsecutive data transfer module 114 can be included in a client program 112. Such situations can result in the nonconsecutive data transfer module 114 being dedicated to a particular client program 112 and not usable by other client programs, but such a result may be desirable in certain situations. By way of example, a client program 112 that is a video playback application may expect to nonconsecutively download multiple files, and thus may have the nonconsecutive download functionality built into the client program 112 rather than accessed via another module of the computing device 102.

Additionally, although the client program 112 is discussed herein as providing the name of the desired file to the nonconsecutive data transfer module 114, situations can arise in which the client program 112 does not specify the name of the desired file. Rather the nonconsecutive data transfer module 114 can obtain the name of the file in other manners, such as from another module of computing device 102, determining the file name based on the request (e.g., the file name may be inherent in the request), obtaining the name of the file from other sources (e.g., a group policy specified for the computing device 102), and so forth.

In one or more embodiments, a single client program 112 can access a file as it is being downloaded from the service 104 (e.g., while the file is a temporary file on the computing device 102). Additionally or alternatively, multiple client programs 112 can access the file as it is being downloaded from the service 104. A single client program 112 may be able to provide read requests with particular offsets to the nonconsecutive data transfer module 114, or alternatively multiple client programs 112 may be able to provide read requests with particular offsets to the nonconsecutive data transfer module 114. In the latter case, a priority or ranking is used for the different client programs so that if two client programs request reading from two different offsets, the request of one of the two client programs is given priority over the other.

Additionally, in one or more embodiments two client programs can nonconsecutively download the same file. This can result in two temporary files, but once the file has been fully downloaded by one of the two client programs, both of the client programs can cease the nonconsecutive downloading of the file and simply access the downloaded file from the content store 116. Similarly, if one client program desires to nonconsecutively download a file that is already being nonconsecutively downloaded by another client program and download of the file is almost completely (e.g., at least a threshold amount has been downloaded, such as 95% of the bytes in the file). Rather than also attempting to nonconsecutively download the file, the one client program can simply wait for the other client program to finish the nonconsecutive downloading of the file and then access the downloaded file from the content store 116.

In one or more embodiments, the nonconsecutive data transfer module 114 exposes an application programming interface (API) having multiple methods that can be invoked by the client program 112 to leverage the nonconsecutive file downloading discussed herein. These API methods include a method allowing the client program 112 to request nonconsecutive downloading of a file, a method allowing the client program to request a particular portion of the file (e.g., downloading of the file is to jump to a particular offset in the file), a method allowing the client program 112 to register callbacks, a method allowing the client program to perform random reads from a file, a method to obtain the current available byte ranges, and so forth.

In one or more embodiments, the client program 112 can register for various different callbacks. These callbacks are invoked by the nonconsecutive data transfer module 114 to notify the client program 112 that particular events have occurred. These callbacks can include, for example, an indication of portions (e.g., byte ranges) of the file that have been downloaded (e.g., only the byte ranges downloaded since the previous method call to obtain the current available byte ranges or callback received indicating available byte ranges), an indication that the downloading of the file has been completed, an indication that an error occurred in the downloading of the file, and so forth.

A method allowing the client program 112 to request nonconsecutive downloading of a file can include various parameters. In one or more embodiments, the parameters of a method to request nonconsecutive downloading of a file include one or more of: the name of the file, the location of the file, the length of the file, an initial offset into the file to begin the downloading, the uniform resource identifier (URI) of the file in the service, and so forth.

A method allowing the client program 112 to request a particular portion of the file can include various parameters. In one or more embodiments, the parameters of a method to request a particular portion of the file include one or more of: the name of the file and/or a temporary file into which the file is being downloaded, the location of the file and/or the temporary file into which the file is being downloaded, the offset into the file (e.g., a byte offset), and so forth.

A method allowing the client program 112 to perform random reads from a file can include various parameters. In one or more embodiments, the parameters of a method to perform random reads from a file include one or more of: the name of the file, the location of the file, an offset into the file (e.g., a byte offset) indicating the location in the file to be read, an amount of data to be read from the file (e.g., beginning at the offset), and so forth.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 4:
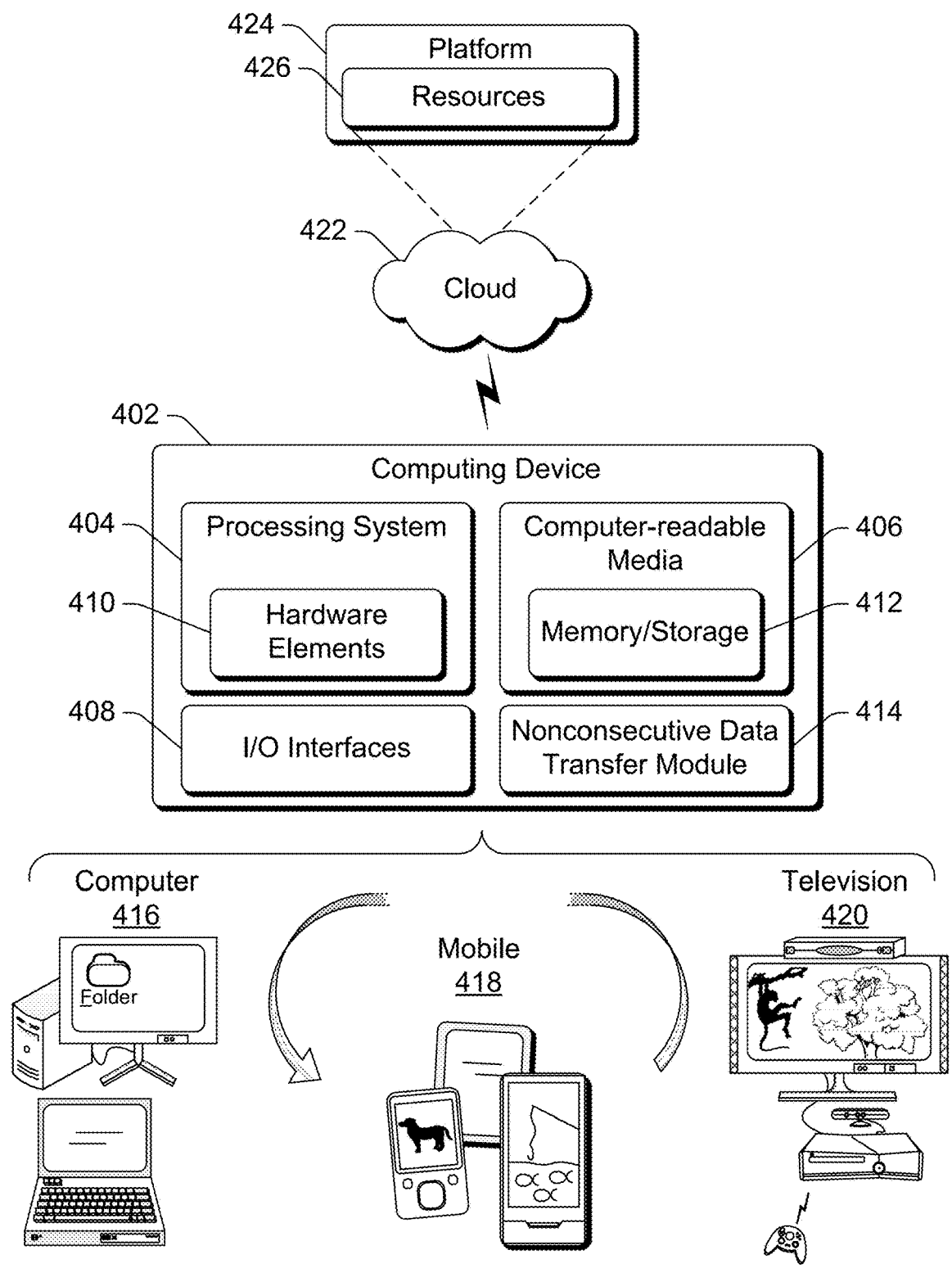
FIG. 4 illustrates an example system that includes an example computing device that is representative of one or more systems and/or devices that may implement the various techniques described herein.

FIG. 4 illustrates an example system generally at 400 that includes an example computing device 402 that is representative of one or more systems and/or devices that may implement the various techniques described herein. The computing device 402 may be, for example, a server of a service provider, a device associated with a client (e.g., a client device), an on-chip system, and/or any other suitable computing device or computing system.

The example computing device 402 as illustrated includes a processing system 404, one or more computer-readable media 406, and one or more I/O Interfaces 408 that are communicatively coupled, one to another. Although not shown, the computing device 402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 404 is representative of functionality to perform one or more operations using hardware. Accordingly, the processing system 404 is illustrated as including hardware elements 410 that may be configured as processors, functional blocks, and so forth. This may include implementation in hardware as an application specific integrated circuit or other logic device formed using one or more semiconductors. The hardware elements 410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 406 is illustrated as including memory/storage 412. The memory/storage 412 represents memory/storage capacity associated with one or more computer-readable media. The memory/storage 412 may include volatile media (such as random access memory (RAM)) and/or nonvolatile media (such as read only memory (ROM), Resistive RAM (ReRAM), Flash memory, optical disks, magnetic disks, and so forth). The memory/storage 412 may include fixed media (e.g., RAM, ROM, a fixed hard drive, and so on) as well as removable media (e.g., Flash memory, a removable hard drive, an optical disc, and so forth). The computer-readable media 406 may be configured in a variety of other ways as further described below.

The one or more input/output interface(s) 408 are representative of functionality to allow a user to enter commands and information to computing device 402, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth.

Examples of output devices include a display device (e.g., a monitor or projector), speakers, a printer, a network card, tactile-response device, and so forth. Thus, the computing device 402 may be configured in a variety of ways as further described below to support user interaction.

The computing device 402 also includes a nonconsecutive data transfer module 414. The nonconsecutive data transfer module 414 provides support for nonconsecutively downloading files as discussed above. The nonconsecutive data transfer module 414 can implement, for example, the nonconsecutive data transfer module 114 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 402. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 410 and computer-readable media 406 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 410. The computing device 402 may be configured to implement particular instructions and/or functions corresponding to the software and/or hardware modules. Accordingly, implementation of modules as a module that is executable by the computing device 402 as software may be achieved at least partially in hardware, e.g., through use of computer-readable storage media and/or hardware elements 410 of the processing system. The instructions and/or functions may be executable/operable by one or more articles of manufacture (for example, one or more computing devices 402 and/or processing systems 404) to implement techniques, modules, and examples described herein.

As further illustrated in FIG. 4, the example system 400 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 400, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 402 may assume a variety of different configurations, such as for computer 416, mobile 418, and television 420 uses. Each of these configurations includes devices that may have generally different constructs and capabilities, and thus the computing device 402 may be configured according to one or more of the different device classes. For instance, the computing device 402 may be implemented as the computer 416 class of a device that includes a personal computer, desktop computer, a multi-screen computer, laptop computer, netbook, and so on.

The computing device 402 may also be implemented as the mobile 418 class of device that includes mobile devices, such as a mobile phone, portable music player, portable gaming device, a tablet computer, a multi-screen computer, and so on. The computing device 402 may also be implemented as the television 420 class of device that includes devices having or connected to generally larger screens in casual viewing environments. These devices include televisions, set-top boxes, gaming consoles, and so on.

The techniques described herein may be supported by these various configurations of the computing device 402 and are not limited to the specific examples of the techniques described herein. This functionality may also be implemented all or in part through use of a distributed system, such as over a "cloud" 422 via a platform 424 as described below.

The cloud 422 includes and/or is representative of a platform 424 for resources 426. The platform 424 abstracts underlying functionality of hardware (e.g., servers) and software resources of the cloud 422. The resources 426 may include applications and/or data that can be utilized while computer processing is executed on servers that are remote from the computing device 402. Resources 426 can also include services provided over the Internet and/or through a subscriber network, such as a cellular or Wi-Fi network.

The platform 424 may abstract resources and functions to connect the computing device 402 with other computing devices. The platform 424 may also serve to abstract scaling of resources to provide a corresponding level of scale to encountered demand for the resources 426 that are implemented via the platform 424. Accordingly, in an interconnected device embodiment, implementation of functionality described herein may be distributed throughout the system 400. For example, the functionality may be implemented in part on the computing device 402 as well as via the platform 424 that abstracts the functionality of the cloud 422.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method implemented in a computing device, the method comprising: communicating, with a service, to retrieve a file from the service via a network; receiving, from a program on the computing device, a request for a particular portion of the file in nonconsecutive order; retrieving, from the service, the requested particular portion of the file; storing the retrieved particular portion of the file; and making the stored particular portion of the file available to the program prior to the entirety of the file being retrieved from the service.

Alternatively or in addition to any of the above described methods, any one or combination of: the request specifying an offset into the file; the method further comprising receiving, from the program, an additional request for an additional portion of the file, the additional request specifying the an offset into the file that is nonconsecutive with a most recently received portion of the file, retrieving, from the service, the requested additional portion of the file, and storing the retrieved additional portion of the file; the storing comprising storing the retrieved particular portion of the file in a temporary file on the computing device, the method further comprising converting the temporary file to a permanent file after all of the data for the file has been retrieved from the service; the method further comprising maintaining a record of portions of the file that have been downloaded from the service, and providing to the program an indication of the portions of the file that have been downloaded; the method further comprising allowing the program as well as one or more additional programs to access the file prior to all the data for the file having been retrieved from the service; the method further comprising retrieving, from the service, the content of the file consecutively absent any request for a particular portion of the file from the program; the method further comprising automatically retrieving, from the service after the particular portion of the file is retrieved, additional portions of the file that have not yet been retrieved; the retrieving the requested particular portion of the file from the service comprising skipping over any byte ranges in the file that have been previously received form the service; the method further comprising exposing an application programming interface (API) method, and receiving the request via the program invoking the exposed API method; the method further comprising allowing the program as well as an additional program to nonconsecutively download the file, determining that download of the file has been completed by one of the program and the additional program, and ceasing nonconsecutive downloading of the file by the other of the program and the additional program; the method further comprising receiving a request from an additional program to nonconsecutively download the file, determining that at least a threshold amount of the file has been nonconsecutively downloaded, and waiting for the downloading of the file to be completed rather than beginning an additional nonconsecutive download of the file for the additional program.

A computing device comprising: a processor; and a computer-readable storage medium having stored thereon multiple instructions that, responsive to execution the processor, cause the processor to perform acts comprising: communicating, with a service, to retrieve a file from the service via a network; receiving, from a program on the computing device, a request for data beginning at a particular offset into the file, the particular offset being nonconsecutive with most recently received bytes of the file; retrieving, from the service, data from the file beginning at the offset; storing the retrieved data in a temporary file; and making the stored data in the temporary file available to the program prior to the entirety of the file being retrieved from the service.

Alternatively or in addition to any of the above described computing devices, any one or combination of: the offset into the file comprising a byte offset into the file; the acts further comprising converting the temporary file to a permanent file after all of the data for the file has been retrieved from the service; the acts further comprising maintaining a record of byte ranges of the file that have been downloaded from the service, and providing to the program an indication of the byte ranges of the file that have been downloaded.

A method implemented in a computing device, the method comprising: communicating, to a nonconsecutive data transfer module in the computing device, a request for a file to be retrieved from a service; receiving, from the nonconsecutive data transfer module, an indication of a temporary file that includes at least some of the data for the file; communicating, to the nonconsecutive data transfer module, a request for a particular portion of the file in nonconsecutive order; reading, from the temporary file, data stored in the particular portion of the temporary file; and using the read data prior to the downloading of the file being completed.

Alternatively or in addition to any of the above described methods, any one or combination of: the request further including an identifier of the location of the file; the method further comprising displaying content based on the read data stored in the particular portion; the communicating comprising invoking an application programming interface (API) method exposed by the data transfer module.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device, the method comprising:
   communicating, with a service, to retrieve a file from the service via a network;
   receiving, from a program on the computing device, a request for a particular portion of the file in nonconsecutive order;
   retrieving, from the service, the requested particular portion of the file;
   storing the retrieved particular portion of the file;
   making the stored particular portion of the file available to the program prior to the entirety of the file being retrieved from the service;
   receiving a request from an additional program to nonconsecutively download the file;
   determining that at least a threshold amount of the file has been nonconsecutively downloaded; and
   waiting for the downloading of the file to be completed rather than beginning an additional nonconsecutive download of the file for the additional program.

2. The method as recited in claim 1, the request specifying an offset into the file.

3. The method as recited in claim 1, further comprising:
   receiving, from the program, an additional request for an additional portion of the file, the additional request specifying an offset into the file that is nonconsecutive with a most recently received portion of the file;
   retrieving, from the service, the requested additional portion of the file; and
   storing the retrieved additional portion of the file.

4. The method as recited in claim 1, the storing comprising storing the retrieved particular portion of the file in a temporary file on the computing device, the method further comprising converting the temporary file to a permanent file after all of the data for the file has been retrieved from the service.

5. The method as recited in claim 1, further comprising maintaining a record of portions of the file that have been downloaded from the service and providing to the program an indication of the portions of the file that have been downloaded.

6. The method as recited in claim 1, further comprising allowing the program and the additional program to access the file prior to all the data for the file having been retrieved from the service.

7. The method as recited in claim 1, further comprising:
   retrieving, from the service, the entirety of the file consecutively absent any request for a particular portion of the file from the program.

8. The method as recited in claim 1, further comprising:
   automatically retrieving, from the service after the particular portion of the file is retrieved, additional portions of the file that have not yet been retrieved.

9. The method as recited in claim 1, the retrieving the requested particular portion of the file from the service comprising skipping over any byte ranges in the file that have been previously received form the service.

10. The method as recited in claim 1, further comprising:
    exposing an application programming interface (API) method; and
    receiving the request via the program invoking the exposed API method.

11. The method as recited in claim 1, further comprising:
    allowing the program as well as the additional program to nonconsecutively download the file;
    determining that download of the file has been completed by one of the program and the additional program; and
    ceasing nonconsecutive downloading of the file by the other of the program and the additional program.

12. A computing device comprising:
    a processor; and
    a computer-readable storage medium having stored thereon multiple instructions that, responsive to execution by the processor, cause the processor to perform acts comprising:
      communicating, with a service, to retrieve a file from the service via a network;
      receiving, from a program on the computing device, a request for data beginning at a particular offset into the file;
      retrieving, from the service, data from the file beginning at the particular offset;
      storing the retrieved data in a temporary file;
      making the stored data in the temporary file available to the program prior to the entirety of the file being retrieved from the service;
      receiving a request from an additional program to nonconsecutively download the file;
      determining that at least a threshold amount of the file has been nonconsecutively downloaded; and
      waiting for the downloading of the file to be completed rather than beginning an additional nonconsecutive download of the file for the additional program.

13. The computing device as recited in claim 12, the particular offset into the file comprising a byte offset into the file.

14. The computing device as recited in claim 12, further comprising converting the temporary file to a permanent file after all of the data for the file has been retrieved from the service.

15. The computing device as recited in claim 12, further comprising maintaining a record of byte ranges of the file that have been downloaded from the service and providing to the program an indication of the byte ranges of the file that have been downloaded.

16. A method implemented in a computing device, the method comprising:
    communicating, to a nonconsecutive data transfer module in the computing device, a request for a file to be retrieved from a service, the file comprising data;
    receiving, from the nonconsecutive data transfer module, an indication of a temporary file that includes at least some of the data of the file;

communicating, from a client program on the computing device, to the nonconsecutive data transfer module, a request for a particular byte range of the file in nonconsecutive order;

reading by the client program, from the temporary file, the data of the file stored in the temporary file corresponding to the particular byte range; and using, by the client program, the data read from the temporary file prior to the downloading of the file being completed.

17. The method as recited in claim 16, the request further including an identifier of a location of the file.

18. The method as recited in claim 16, further comprising displaying content based on the data read from the temporary file corresponding to the particular byte range.

19. The method as recited in claim 16, the communicating comprising invoking an application programming interface (API) method exposed by the nonconsecutive data transfer module.

20. The method as recited in claim 16, further comprising obtaining, by the client program, the particular byte range of the file from a table of contents in the file or from metadata associated with the file.

* * * * *